US008010325B2

(12) United States Patent
De Barros et al.

(10) Patent No.: US 8,010,325 B2
(45) Date of Patent: Aug. 30, 2011

(54) FAILURE SIMULATION AND AVAILABILITY REPORT ON SAME

(75) Inventors: Marcelo M. De Barros, Redmond, WA (US); Hui Shi, Redmond, WA (US); Joseph Forsmann, Redmond, WA (US); Manish Mittal, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 472 days.

(21) Appl. No.: 12/109,368

(22) Filed: Apr. 25, 2008

(65) Prior Publication Data

US 2009/0271170 A1 Oct. 29, 2009

(51) Int. Cl.
*G06F 17/50* (2006.01)
*G06F 9/445* (2006.01)
(52) U.S. Cl. ............ 703/2; 703/5; 703/21; 703/22; 702/62; 340/539
(58) Field of Classification Search ............ 703/2, 5, 703/22, 21; 702/62; 340/539
See application file for complete search history.

(56) References Cited

U.S. PATENT DOCUMENTS

| | | | |
|---|---|---|---|
| 4,870,704 A * | 9/1989 | Matelan et al. | 710/120 |
| 6,918,059 B1 | 7/2005 | Galuten et al. | |
| 7,092,707 B2 | 8/2006 | Lau et al. | |
| 7,206,972 B2 | 4/2007 | Wilson et al. | |
| 7,225,356 B2 | 5/2007 | Monitzer | |
| 7,239,979 B1 | 7/2007 | McComber et al. | |
| 2005/0193225 A1 | 9/2005 | Macbeth et al. | |
| 2006/0161819 A1 | 7/2006 | Orit et al. | |
| 2007/0168201 A1 | 7/2007 | Chellam | |
| 2008/0001735 A1 * | 1/2008 | Tran | 340/539.22 |
| 2009/0076749 A1 * | 3/2009 | Nasle | 702/62 |

OTHER PUBLICATIONS

Brown, et al., "Towards Availability Benchmarks: A Case Study of Software RAID Systems", Proceedings of the 2000 USENIX Annual Technical Conference, San Diego, CA, Jun. 2000. 18 Pages.
Abstract of article (dated 2003) entitled "Prioritized failure recovery in communication networks and its transient analysis" (Sun, et al.).

* cited by examiner

*Primary Examiner* — Thai Phan (57) ABSTRACT

A simulation may be performed to assess availability of a service in the event of various types of failures. A specification may describe a behavior to be induced on a machine, and a formula under which availability is to be measured. A controller processes the specification and dispatches a request to induce the behavior to a machine on which the behavior is to be induced. An agent on that machine may look up a routine in a simulation library and may use the routine to induce the behavior. Data, such as performance counter values, are collected before, during, and/or after occurrence of the behavior, and are transmitted back to the controller. A report generator applies the formula contained in the specification to the data received to calculate the availability metric, and produces a report containing that metric.

20 Claims, 5 Drawing Sheets

FAILURE SIMULATION AND AVAILABILITY REPORT ON SAME

BACKGROUND

Services (e.g., web services, database services, etc.) are often implemented through large-scale systems with many servers. The large number of hardware and software components on these servers provides many potential points of failure. For example, a disk or network card could stop working, or a program could crash. A provider of such a service may want to evaluate how various kinds of failures affect availability of the service. For example, one type of failure may cause a 0.05% drop in availability of the service and another type may cause a 50% drop in availability. If these failures occur at the same time, then it makes sense to direct resources to fixing the second failure before fixing the first. Simulating failures in a test environment provides information from which this type of decision can be made if a failure occurs organically.

An administrator, or other person, can cause a failure to occur while load runs against the system, thereby providing some information about how the system would react in the event that a component fails. In general, the execution of these test failures, and recovery from the failures, is a manual process. For example, an administrator could cause a specific failure, and could look at system performance during the failure. However, these manual techniques generally take an ad hoc approach to failure simulation, and make it difficult to orchestrate a complex set of failures, or to measure, accurately, how these failures affect the availability of the service that the system implements.

SUMMARY

A specification may describe a failure simulation to be performed, and an availability metric to be calculated. The specification may describe one or more behaviors (e.g., application crash, disk failure, network failure, etc.) to be induced at various machines. The specification may also contain formulas for calculating availability metrics based on performance counter values collected before, during, and/or after the behavior occurs. An agent is installed on each machine at which a behavior is to be induced. A controller receives the specification, and instructs the agent to induce certain behavior(s) based on the simulation described in the specification. The specification may describe various behaviors to be induced on different machines in a particular sequence, such as shutting down a program on machine A at a particular time, and then shutting down the disk drive on machine B at a different time (e.g., five minutes later).

The agent may look up, in a simulation library, the behavior to be performed. The library may contain routines that execute failures and/or recover from failures. For example, a library routine might shut down a particular program, or a particular piece of hardware, and may restart the service or hardware at a particular time. For example, a specification may call for a given device on a given machine to be shut down for five minutes. Thus, the controller could instruct the agent to shut down that device and then restart it five minutes later. The agent could record the values of various performance counter on the machine before, during, and/or after the device is shut down, and could report on the actual times at which the device was shut down and/or restarted. The recorded values of the performance counters could be sent to a report generator (possibly by way of the controller). The report generator may then calculate availability metrics as a function of the recorded performance counter values, and may generate a report containing the availability metrics. The report may be dynamically updated while a simulation progresses.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Many types of computing functionality are provided as on-line services. Traditionally, computing functionality has taken the form of stand-alone software that runs on a user's computer. Today, however, many computing functions are provided either as on-line services accessible through a passive client, or through some cooperation between a server and a smart client. The use of on-line services to provide functionality has expanded beyond its traditional realm (e.g., large-scale database access, e-commerce, e-mail, etc.), and now includes areas that were previously handled by stand-alone software (e.g., word processing and document management, performed through cooperation of a server and a thin client). With the expansion of on-line services, there is reason to focus on maintaining these services' level of availability.

Providers of services may wish to analyze the fault-tolerance of their systems in various failure scenarios, in order to determine how to respond if such a failure occurs organically. There are various types of software or hardware failures that could occur (e.g., crashed program, crashed disk, stalled network card, etc.). The impact on service availability may depend on which type of failure occurred, where it occurred, how long it occurred for, etc. To find out the overall impact, an analyst may simulate various types of failures and may analyze the impact of these failures on a service. In the event that a particular failure occurs, the knowledge gained from the simulation may be used to determine how to respond. For example, if a failure of type A is found to reduce service availability by a small amount and a failure of type B is found to reduce service availability by a large amount, then the administrators of that service may use this information to determine the relatively priority in responding to each type of failure.

Simulating failures is generally performed as a manual process. In an off-line test environment, one could use a load generator to generate load against a system, and could then generate various conditions while measuring performance. However, with this type of failure simulation, it is difficult to execute complex simulations or to measure availability accurately. The subject matter described herein provides a system that, among other things, may execute a simulation and measure availability according to a specification.

Figure 1:
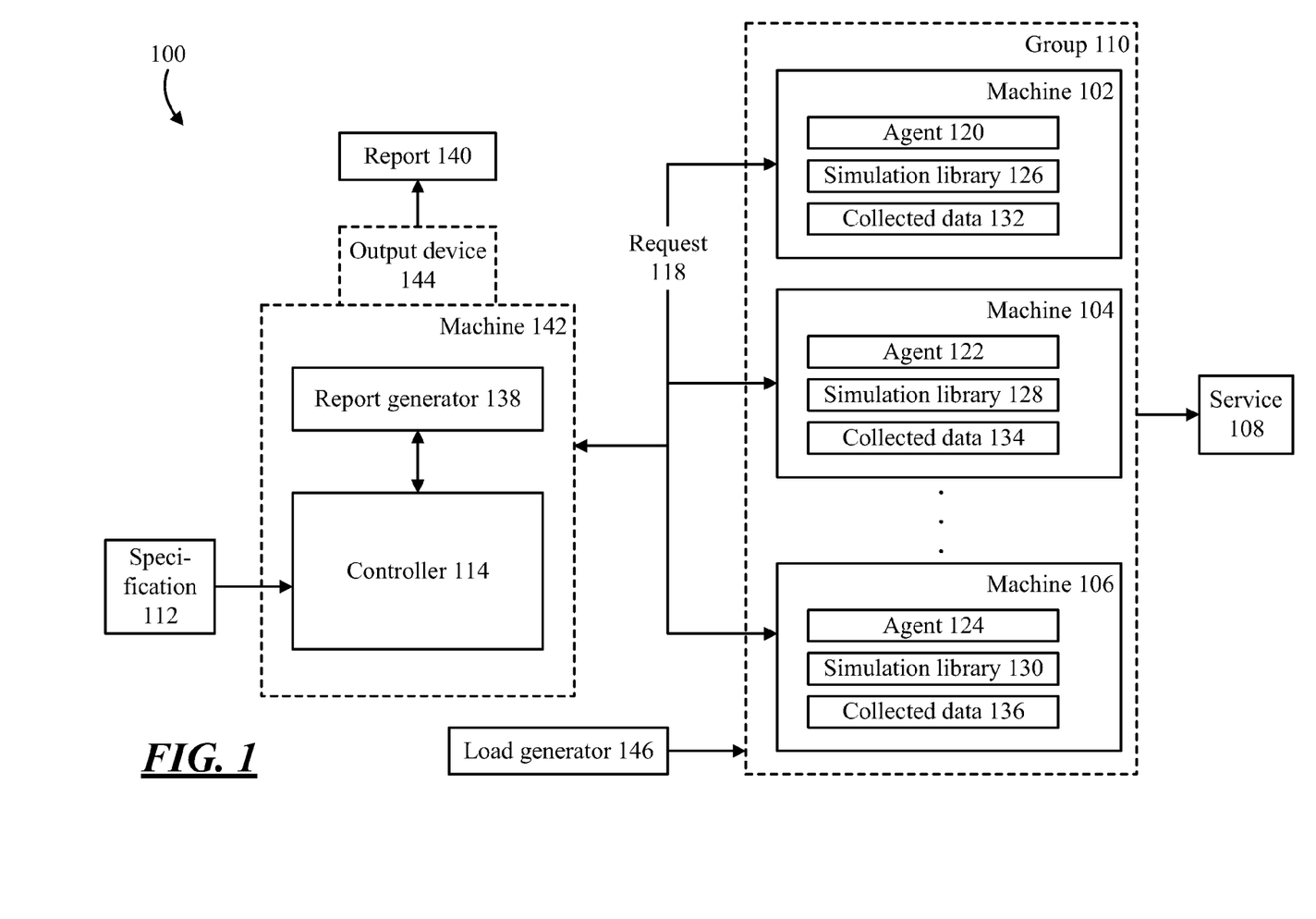
FIG. 1 is a block diagram of an example arrangement in which a simulation may be performed, and in which availability may be evaluated.

Turning now to the drawings, FIG. 1 shows an example arrangement 100 in which a simulation may be performed and evaluated. Machines 102, 104, and 106 are machines (such as servers, or any other type of machines) that provide a service 108. For example, machines 102, 104, and 106 could be servers in a cluster that provides a web service, a database service, or any other type of service. Machines 102, 104, and 106 may form part of a group 110. The above-mentioned server cluster is an example of such a group. Service 108 could be provided by each machine, acting individually. As another example, the collective action of machines in group 110 could provide service 108. FIG. 1 shows an example in which there are three machines 102, 104, and 106, although any number of machines could be used.

An entity (e.g., a company or other organization) that operates machines 102, 104, and 106 may wish to evaluate those machines' ability to provide service 108 in the presence of various types of failures or unusual circumstances. For example, service 108 may be a web service that performs retail sales, banking, or any other type of function. The entity that uses the machines to provide service 108 may wish to determine the number of transactions that can be processed per second, the latency time, or any other performance characteristic, in the event that one of the machines crashes, or loses network connectivity, or experiences a high load on its processor. As another example, service 108 may be a database service that provides records within a corporation's (or other organization's) intranet, and the administrators responsible for the intranet may wish to evaluate the throughput of data requests in the event of some type of failure or other circumstance. Components within arrangement 100 may be used to make this evaluation.

Specification 112 may specify a simulation to be performed, where the availability of service 108 may be evaluated under the specified simulation. The simulation may involve a particular behavior to be performed, such as shutting down a program or device, overloading a processor, filling up a storage device, etc. (The behavior may be actually carried out, not merely simulated. However the behavior is said to be part of a "simulation" in the sense that the behavior may arise as part of a performance test even if the behavior does not arise organically.) Specification 112 may also specify a formula that may be used to evaluate availability of service 108, or some other aspect of performance, in the time during and/or surrounding the simulation. For example, a formula could be specified as a function of one or more performance counters recorded on machines on which a behavior is induced. An example of a simulation and a formula is further described below in connection with FIG. 6.

Controller 114 is a component that receives specification 112 and issues requests to appropriate machines (such as machines 102, 104, and 106) in order to perform the simulation specified in specification 112. Controller 114 may requests that various different machines perform various different behaviors. For example, a particular simulation may involve shutting down an application on one machine, and then shutting down a network card on another machine (possibly at the same time, possibly at different times). Controller 114 may dispatch these requests to the appropriate machines at the appropriate times. FIG. 1 shows an example in which controller 114 dispatches a single request (request 118) to a single machine (machine 102), although any number of requests could be dispatched to any one or more of the machines.

To support carrying out simulations, each of machines 102 may be configured with an instance of a simulation agent, and a simulation library. A simulation agent is a component that may carry out requests dispatched by controller 114. A simulation agent may also collect data (e.g., performance counter values) that may be used to evaluate performance in the time during and surrounding the simulation. A simulation library comprises code that may be used to carry out the various behaviors called for as part of a simulation. For example, the simulation library may contain routines to shut down and restart an application, to shut down and restart a network card, etc. The agent may execute these routines by retrieving them from the library. The simulation agent may, at the request of controller 114, invoke one of these routines in order to induce a behavior called for in the simulation. Each machine 102 may have an instance of the agent and the simulation library. Thus, in the example of FIG. 1, machines 102, 104, and 106 have agents 120, 122, and 124, respectively, installed thereon. Moreover, machines 102, 104, and 106 have simulation libraries 126, 128, and 130, respectively. Since each machine is configured with a simulation library and an agent, a machine may participate in a simulation even if the simulation causes the machine to lose communication with controller 114. For example, if the behavior to be simulated is shutting down a network card at a particular machine, then an agent at the machine could shut down, and later restart, the network card, even though the machine does not receive network instructions from controller 114 during the time that the network card is shut down.

The various machines (such as machines 102, 104, and 106) may have performance counters that measure aspects of performance at those machines. Example of measurements that may be taken by performance counters include latency, successful or failed transactions per second, percentage of processor utilization, percentage of memory utilization, disk queue length, or any other measurement. At any point in time, the value of a performance counter may be recorded in order to provide a snapshot of the state of the system at that particular point in time. These values may be collected as part of a simulation. For example, an agent (such as agent 120) may direct that the performance counter values be taken at specific intervals (e.g., every second, millisecond, etc.), or in response to particular events (e.g., upon commencement of a behavior, upon termination of a behavior, etc.). These values may be collected so that they may be transmitted back to controller 114. Collected data 132, 134, and 136 (on machines 102, 104, and 106, respectively) may comprise these stored values obtained from performance counters at particular points in time. The collected data may also include the time at which each value was captured, in order to facilitate temporal analysis of the data, such as indicating performance levels before, during, and after the simulation.

During the time that a simulation is being carried out, load generator 146 may create a load in order to simulate normal operating conditions. For example, if machines 102, 104, and 106 implement a web service, then normal load conditions would involve a certain amount of traffic in which users interact with the web servers. Load generator 146 may be used to simulate this load, thereby allowing simulations to be carried out in a test environment in order to avoid disrupting actual users' use of the system.

Report generator 138 may generate a report 140 that indicates how well a machine, or an overall system, performed during the simulation (and may also indicate performance before and/or after the simulation). As noted above, specification 112 may indicate a formula, which specifies how to calculate a performance indicator (such as a metric that measure availability of service 108, or some other aspect of performance) as a function of one or more performance counters. Report generator 138 applies this formula as part of generating a report. Report generator 138 and controller 114 may be separate components (but could also be implemented as a single component). Report generator 138 and controller 114 may operate on the same machine 142 (as shown in the example of FIG. 1), but could also operate on separate machines. The machine on which report generator 138 operates (whether that machine is machine 142 or some other machine) may comprise, or may otherwise be connected to, output device 144 in order to communicate report 140 to a person, or to some other point outside of that machine. In one example, output device 144 is a video monitor on which report 140 is displayed, although output device 144 could take any form.

Figure 2:
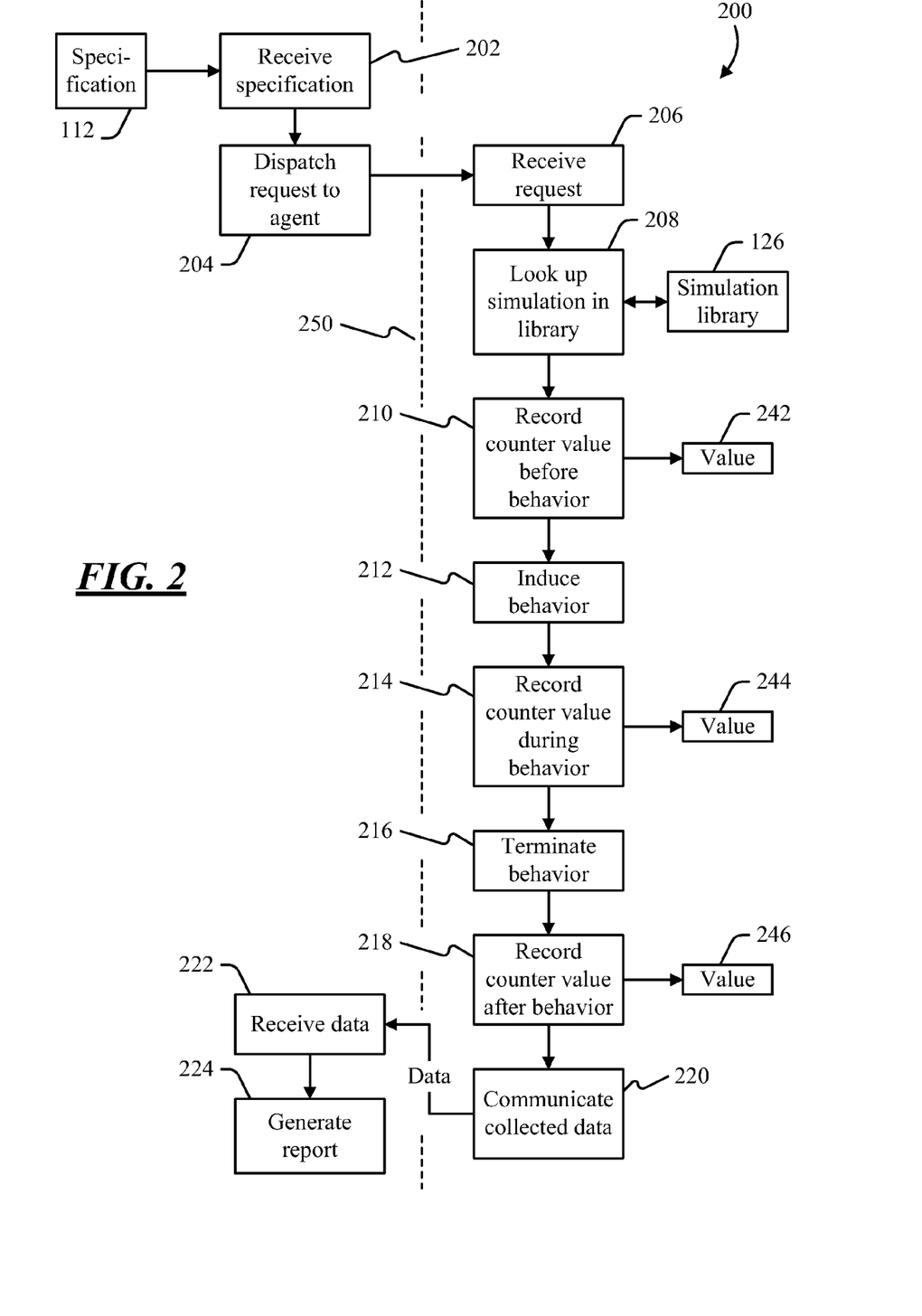
FIG. 2 is a flow diagram of an example process in which a simulation may be carried out, and in which an assessment of availability may be made.
Figure 4:
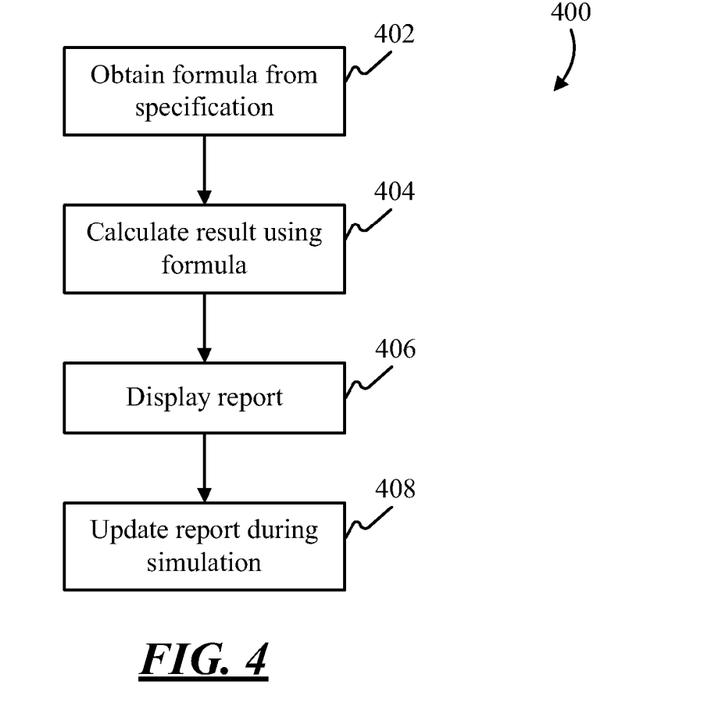
FIG. 4 is a flow diagram of an example process of generating a report.

FIG. 2 shows, in the form of a flow diagram, an example process 200 in which a simulation may be carried out, and in which an assessment of a service's availability (or some other aspect of system performance) may be made. Before turning to a description of FIG. 2, it is noted that the flow diagrams contained herein (both in FIG. 2 and in FIG. 4) are described, by way of example, with reference to components shown in FIG. 1, although these processes may be carried out in any system and are not limited to the scenario shown in FIG. 1. Additionally, each of the flow diagrams in FIGS. 2 and 4 shows an example in which stages of a process are carried out in a particular order, as indicated by the lines connecting the blocks, but the various stages shown in these diagrams can be performed in any order, or in any combination or sub-combination.

Returning now to FIG. 2, at 202 a specification 112 is received. For example, specification 112 may be received by controller 114 (shown in FIG. 1). Specification 112 may specify one or more simulations to be performed. These simulations may involve various behaviors, such as stopping a program, shutting down hardware, etc. Specification 112 may specify one or more particular machines on which these behaviors are to be induced, and may specify a particular time at which the behaviors are to be induced, and/or a particular sequence of behaviors (e.g., shut down a particular application on one machine, then shut down the network card on another machine five minutes later). Based on the specification, requests to perform these behaviors are dispatched (at 204) to the agent(s) at the machine(s) on which the behavior (s) are to be induced.

A request to induce a behavior is then received (at 206) at a particular machine. For example, if a behavior is to be induced at machine 102 (shown in FIG. 1), then a request may be received by agent 120 (also shown in FIG. 1). (In one example, boxes to the left of vertical dotted line 250 may be performed by a controller and/or report generator, and boxes to the right of line 250 may be performed by an agent. However, the stages shown in the boxes in FIG. 2 may be carried out on any component or on any machine, and are not limited to this example.)

The particular behavior that has been requested is looked up (at 208) in a simulation library (e.g., simulation library 126). As noted above, a simulation library may contain routines that carry out various behaviors, such as shutting down and/or restarting a program or a piece of hardware. These routines may take any form, such as an executable file that could be executed on a command line, or a dynamic link library (DLL) that could be invoked through an appropriate function. The routine that will carry out the requested behavior is obtained from the simulation library.

At 210, the value 242 of a performance counter may be recorded. This recorded value may be stored (e.g., among collected data 132, shown in FIG. 1), and the value may later be communicated to a report generator in order to be used in a report. In some cases, measuring availability (or some other feature of performance) involves comparing the performance of a system before, during, and/or after a particular behavior has occurred. For example, if the behavior to be induced is shutting down a disk drive, then comparing the number of transactions processed per second before and during the time that the disk drive is out of service may indicate whether the disk drive has any affect on transaction throughput. Moreover, some behaviors are difficult to recover from, and, if performance drops as a result of some behavior, an analyst may wish to know whether, and how fast, performance recovers to its pre-behavior level once the behavior ceases. Thus, values of performance counters may be recorded before, during, and/or after a behavior is carried out (and any number of performance counter values may be recorded any number of times). The recording of performance counter values may be performed by an agent, but could be performed by any component. The recorded counter values may be stored with the time at which they were recorded.

At 212, the requested behavior is induced. The inducing of behavior may be performed, for example, by an agent executing a routine obtained from a simulation library, although the behavior could be induced in any manner. Inducing a behavior may involve waiting for some process to finish. For example, if the behavior to be induced is the shutting down of a program, the program may have a queue of unprocessed transactions, and a simulation may involve waiting for the transactions to be performed before the program is actually shut down. Under such conditions, the behavior might not commence at the time it is requested, so an agent could record the time at which the behavior actually commences. This time could be recorded among the collected data, and could be communicated to a report generator. The report generator could compare the time at which the behavior commences with the time at which various performance counter values were taken, in order to determine whether a particular counter value was taken before, during, or after the behavior.

Figure 3:
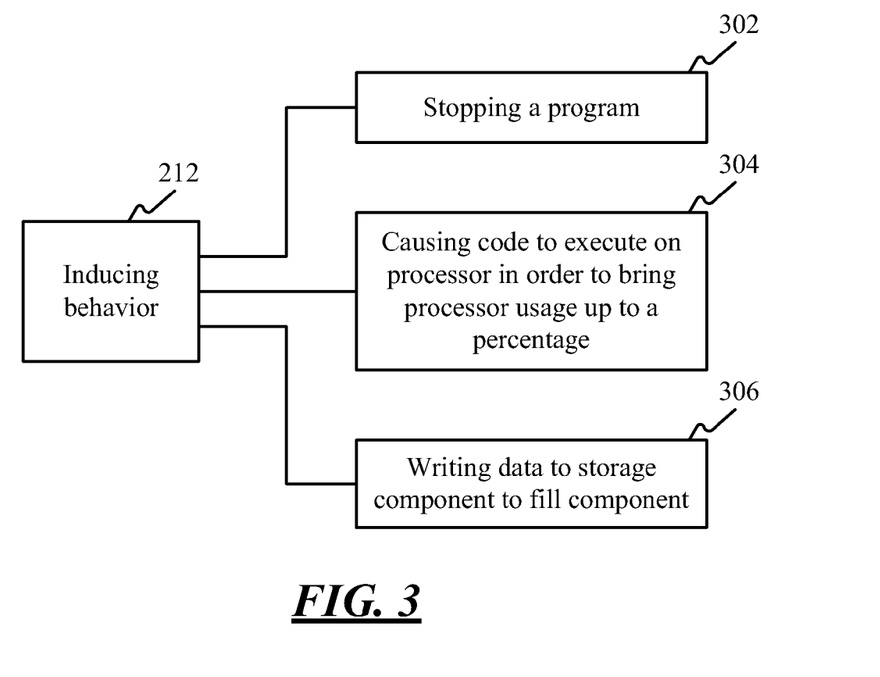
FIG. 3 is a block diagram of some examples of behaviors that may be induced.

Inducing of behavior, at 212, may take various forms. FIG. 3 shows some examples of behaviors that could be induced at 212. One example of a behavior that may be induced non-operation (stoppage) of a program (block 302). For example, the system being tested may be a server cluster that implements a web service, and a simulation may be performed to test the availability and recovery time of the service if the web application that implements the service crashes on one of the servers in the cluster. In this case, inducing the behavior may comprise stopping the program from running (and possibly restarting it again later).

Another example of a behavior that may be induced is to overload a processor. For example, a simulation may be performed to determine service availability (or some other performance characteristic) in the event that the load on a particular machine's processor exceeds, e.g., 90% capacity. In this case, inducing the behavior may comprise creating this load on the processor by causing code to execute on the processor until the processor's utilization reaches some percentage (block 304).

A further example of a behavior that may be induced is to fill a storage component to the point that the component becomes unavailable for further storage. A simulation could be performed to determine service availability (or some other performance characteristic) in the event that a storage component, such as a disk, reaches its capacity. In this case, inducing the behavior may comprise writing data to such a storage component until the component becomes full (block 306).

The foregoing are examples of behaviors that may be induced. However, the subject matter described herein may be used to induce any behavior.

Returning to FIG. 2, at 214, the value 244 of a performance counter is recorded during the behavior. For example, the counter(s) whose value(s) were recorded at 210 may have their value(s) recorded, again, at 214. These recorded values may also be stored (e.g., among collected data 132, shown in FIG. 1), so that they may later be communicated to a report generator and used in a report. Counter values may be recorded any number of times during a behavior, which may provide a temporal picture of how, if at all, availability or some other performance characteristic changes throughout the behavior.

At 216, the behavior is terminated. For example, if the behavior is to stop a program or device, then terminating the behavior may involve restarting the program or device. The process to terminate the behavior may be part of the library routine that is used to induce the behavior (or could be a separate routine). Termination of the behavior may be performed by the agent, but could be performed by any component. Since the agent runs on the machine on which the behavior is induced, the agent is able to terminate the behavior without contemporaneous direction from the controller. For example, if the behavior is to take the network card out of service—thereby interfering with the machine's ability to communicate with other machines—then it might not be possible to receive a direction to restart the network card at the time the network card is to be restarted. However, the since the agent is on the machine on which the network card is to be started, the agent can restart the card even though the controller does not communicate with that machine at the time the network card is to be restarted.

Additionally, it is noted that, in some cases, terminating a behavior takes time. For example, it may take a few minutes to restart a large program. The time at which the behavior is terminated could be recorded, and the time could be stored. A report generator could compare the time at which a behavior was terminated with the times at which the various performance counter values were recorded, in order to determine whether a counter value was recorded before, during, and/or after the behavior.

At 218, the value 246 of a performance counter is recorded. As with the other times that a counter value is recorded (at 210 and 214), the recorded counter value may be stored, and may later be used by a report generator. The value of a performance counter may be recorded one or more times after a behavior has been terminated. For example, a system may not recover right away from a behavior, and recording a counter value several times after a behavior has ceased allows the progress of recovery to be considered and used in a report.

At 220, collected data (e.g., the recorded values of performance counters) may be communicated back to controller 114 and/or to report generator 138 (both shown in FIG. 1). In one example, the data is communicated to the controller, which passes the data on to report generator. In another example, the data is communicated directly to the report generator. The data is then received (at 222), and a report based on the data is generated (at 224). Generating a report may involve using a formula contained in specification 112 to perform a calculation. The formula may define an availability metric (or other performance metric) as a function of performance counter values, and generating the report may involve applying this formula to the values that were collected before, during, and/or after a behavior was induced. A formula could be simple or complex. For example, availability of a service may be measured based on performance counters collected across several machines (whether or not behaviors were actually induced on those machines). A formula could take into account any number of performance counters collected across any number of machines, thereby allowing complex and/or subtle feature's of a service's availability to be measured. Moreover, a report could provide statistical features, such as the standard deviation of availability (as calculated by the formula). (The standard deviation might indicate how stable the availability is within a certain period, such as before, during, or after a failure. Low standard deviation may mean that the system is in a stable state from an availability standpoint. Conversely, high standard deviation may mean that availability is fluctuating significantly during that period.)

FIG. 4 shows an example process 400 of generating a report. Process 400 may be carried out by report generator 138 (shown in FIG. 1), and may be used to implement block 224 of FIG. 2. However, report generation could be performed by other processes, and FIG. 4 merely shows an example of such a process.

In process 400, at 402 a formula is obtained from a specification (e.g., from specification 112, shown in FIG. 1). At 404, a result is calculated using the formula. For example, the formula may describe a result (such as availability of a service, or some other performance characteristic) as a function of various performance counters. The result may be calculated by applying the specified formula to the values of the performance counters. The formula may be applied to the performance counters at various points in time—e.g., before, during, and after the behavior called for in a simulation. At 406, a report is displayed based on calculated result(s). The report could involve various types of elements. For example, a report could include the values of various performance counters collected from various machines (possibly including different values for different time periods), or a chart or graph that pictorially show an availability metric defined by a formula (possibly including changes in that metric throughout time). Any type of element could be displayed in the report.

Reports may be static or dynamic. For example, a report may be generated after a simulation is finished. Or, a report could take the form of dynamically-updatable information that changes while the simulation progresses, and the display of this information could be updated in real-time during the simulation (at 408).

Figure 5:
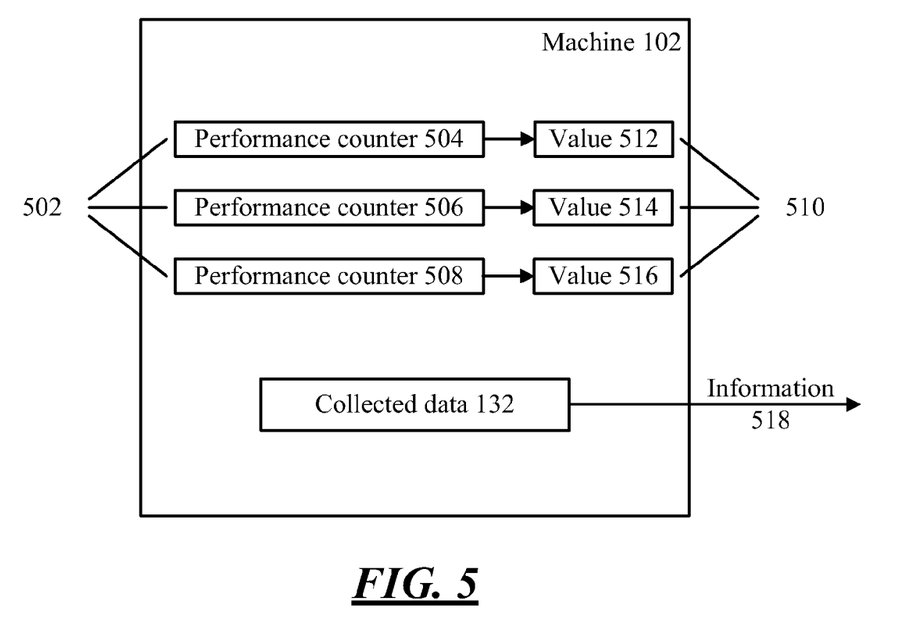
FIG. 5 is a block diagram of an example machine that has performance counters.

As discussed above in connection with FIGS. 1 and 2, various performance counters may exist at a machine, and their values may be recorded at various times. FIG. 5 shows an example of a machine 102 (also shown in FIG. 1) at which such actions may occur. While machine 102 is depicted in FIG. 5, the structure shown in FIG. 5 could apply to any other machine, such as machines 104 and 106 (also shown in FIG. 1).

Machine 102 has one or more performance counters 502. In the example of FIG. 5, a set of performance counters 502 includes performance counter 504, performance counter 506, and performance counter 508, although any number of performance counters could be used. At any given point in time, these performance counters have values 510. Thus, at a particular point in time, performance counter 504 may have value 512, performance counter 506 may have value 514, and performance counter 508 may have value 516. These values (or any subset thereof) may be recorded at one or more points in time. The recorded values may be stored among collected data 132. Information 518 (which may comprise, or may otherwise be based on, collected data 132) may be communicated to a point outside of machine 102—e.g., to controller 114 (shown in FIG. 1).

Figure 6:
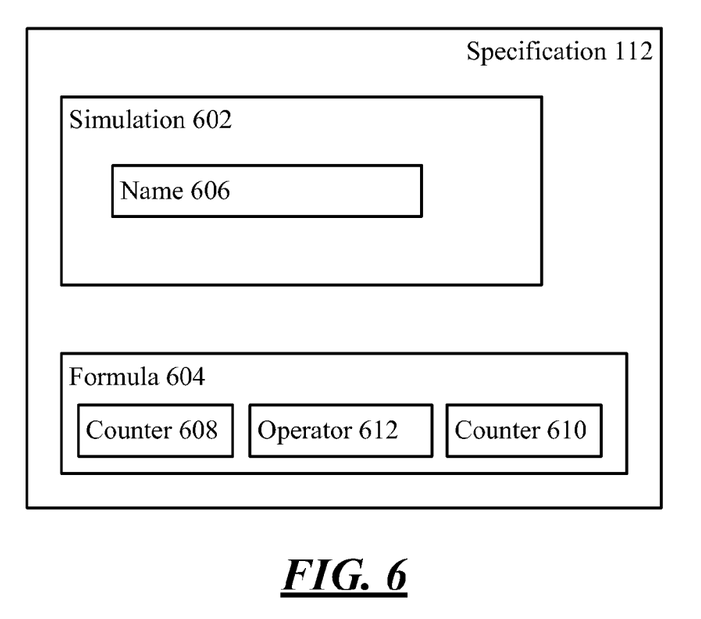
FIG. 6 is a block diagram of an example specification of a simulation and a formula.

As previously noted, a specification may identify a simulation to be performed, as well as a formula for calculating performance from various performance counters. FIG. 6 shows an example specification 112. In the example of FIG. 6, specification 112 indicates a simulation 602, and a formula 604. Simulation 602 may comprise a name 606 (e.g., "database" for a simulation that involves shutting down database software, or "simulation", for a simulation that involves maxing-out utilization of a particular processor). These names could be used to look up the appropriate routine in a simulation library—e.g., the name "database" could identify a file named "database.exe" in the simulation library, which could be executed to induce the behavior associated with the "database" simulation. FIG. 6 shows an example in which a specification contains one simulation, although a specification could specify any number of simulations. Moreover, any number of behaviors could be part of a simulation.

The simulation could be specified, for example, according to an eXtensible Markup Language (XML) schema. For example, the XML specification shown in Table 1 could describe a database simulation:

TABLE 1

```
<Simulation>
    <SimulationServerName>sspr1box1</SimulationServerName>
    <Name>Database</Name>
    <BriefDescription>Shut down database service</BriefDescription>
    <Duration Before="1M" During="1M30S" After="1M"></Duration>
</Simulation>
```

In the simulation defined in the example of Table 1, the simulation is to be performed on a machine named "sspr1box1". The name of the simulation to be performed is "Database". The behavior to be performed as part of this simulation could be, for example, to shut down the database service on the named machine. The duration of the simulation is defined such that information about performance is collected for one minute ("1M") before and after the behavior is induced, and the behavior is to last for one minute and thirty seconds (as indicated by setting the value "During" to "1M30S").

Formula 604 specifies how to calculate a particular description of performance, based on one or more performance counters. In this example, formula 604 is a function of two counters, 608 and 610, joined by some operator 612. For example, operator 612 might be "plus", in which case formula 604 specifies that a result is to be obtained by adding the values of counters 608 and 610, although other operators or combinations of operators could be used. In one example, the specification, including the formula (s), are specified according to an XML schema, in which case an example formula might look like that shown in Table 2.

TABLE 2

```
<Formula>(SPS Service|Successful Request Rate|createaccount – SPS Service|Failed Request Rate|creataccount) / (SPS Service|Last Request Latency|creataccount * 0.01)</Formula>
```

In Table 2, the example formula that is defined subtracts the counter named "SPS Service|Failed Request Rate|creataccount" from the counter named "SPS Service|Successful Request Rate|createaccount", divides the difference by the counter named "SPS Service|Last Request Latency|creataccount", and multiples the quotient by 0.01. What constitutes availability of a given service may depend on the nature of the service. However, a provider of a given service may believe that a number calculated according to this formula characterizes availability of a particular service, so that provider could choose to use this formula to measure availability. However, any formula could be used to measure availability or some other performance characteristic.

Figure 7:
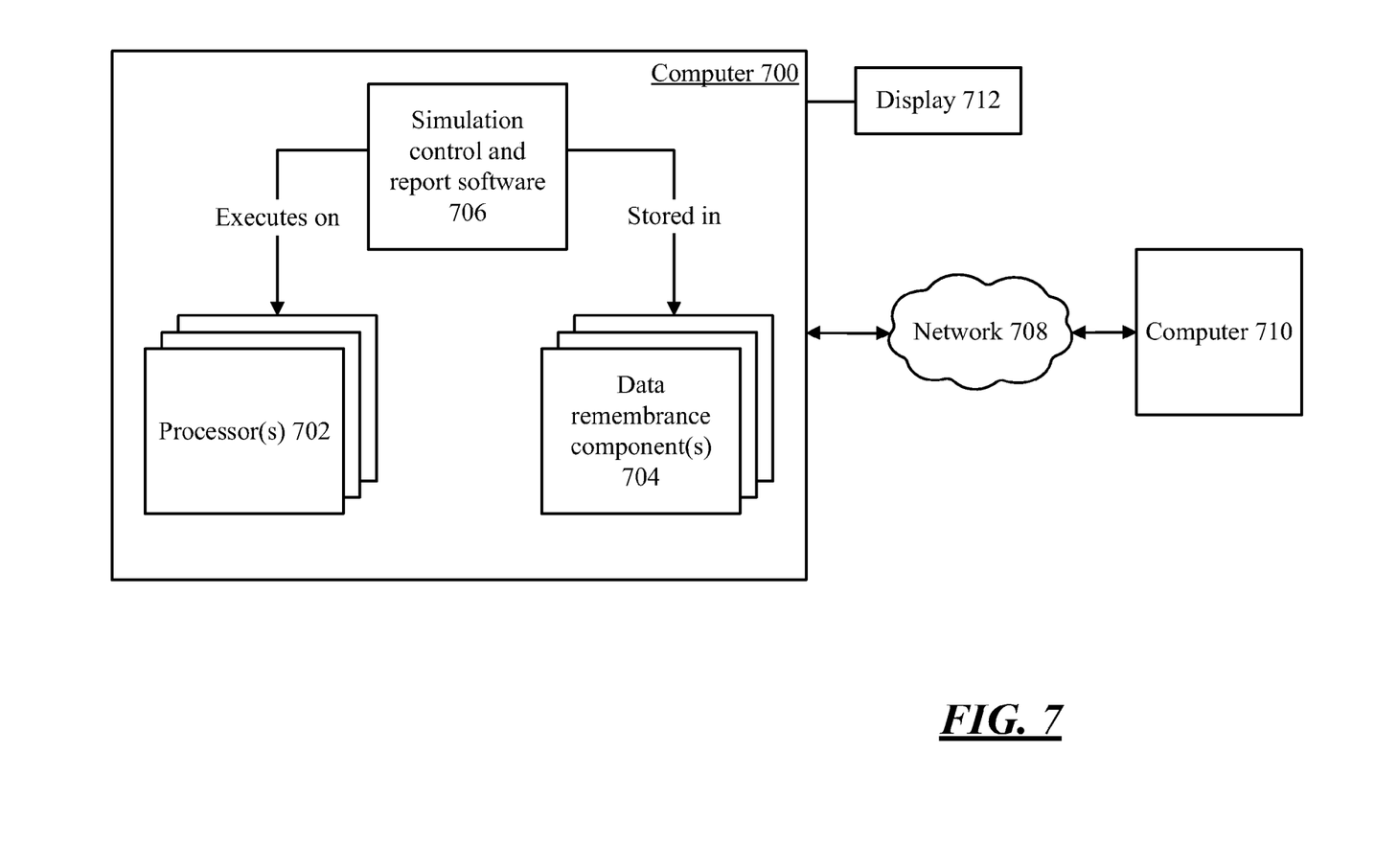
FIG. 7 is a block diagram of example components that may be used in connection with implementations of the subject matter described herein.

FIG. 7 shows an example environment in which aspects of the subject matter described herein may be deployed.

Computer 700 includes one or more processors 702 and one or more data remembrance components 704. Processor(s) 702 are typically microprocessors, such as those found in a personal desktop or laptop computer, a server, a handheld computer, or another kind of computing device. Data remembrance component(s) 704 are components that are capable of storing data for either the short or long term. Examples of data remembrance component(s) 704 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 700 may comprise, or be associated with, display 712, which may be a cathode ray tube (CRT) monitor, a liquid crystal display (LCD) monitor, or any other type of monitor.

Software may be stored in the data remembrance component(s) 704, and may execute on the one or more processor(s) 702. An example of such software is simulation control and report software 706, which may implement some or all of the functionality described above in connection with FIGS. 1-6, although any type of software could be used. Software 706 may be implemented, for example, through one or more components, which may be components in a distributed system, separate files, separate functions, separate objects, separate lines of code, etc. A personal computer in which a program is stored on hard disk, loaded into RAM, and executed on the computer's processor(s) typifies the scenario depicted in FIG. 7, although the subject matter described herein is not limited to this example.

The subject matter described herein can be implemented as software that is stored in one or more of the data remembrance component(s) 704 and that executes on one or more of the processor(s) 702. As another example, the subject matter can be implemented as software having instructions to perform one or more acts of a method, where the instructions are stored on one or more computer-readable storage media. The instructions to perform the acts could be stored on one medium, or could be spread out across plural media, so that the instructions might appear collectively on the one or more computer-readable storage media, regardless of whether all of the instructions happen to be on the same medium.

In one example environment, computer 700 may be communicatively connected to one or more other devices through network 708. Computer 710, which may be similar in structure to computer 700, is an example of a device that can be connected to computer 700, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of evaluating failure tolerance, the method comprising:
   receiving a specification of a simulation to be performed, said simulation comprising a behavior;
   dispatching, to an agent installed at a computer, a request to induce said behavior at said computer;
   receiving, from said agent, data collected at said computer; and
   generating a report, based on said data, that comprises a first indication of performance during occurrence of said behavior.

2. The method of claim 1, wherein said data comprises values collected from a plurality of performance counters, and wherein said generating comprises:
   obtaining, from said specification, a formula that involves said performance counters; and
   calculating a result based on values of said performance counters, said report comprising said result.

3. The method of claim 1, wherein said generating comprises:
   including, in said report, a second indication of performance prior to occurrence of said behavior, and a third indication of performance after occurrence of said behavior.

4. The method of claim 1, further comprising:
   displaying said report during occurrence of said behavior; and
   updating said report based on new data collected at said computer during occurrence of said behavior.

5. The method of claim 1, wherein said computer is, or is part of, a system that processes transactions, and wherein said first indication of performance describes throughput of said transactions through said system.

6. The method of claim 1, wherein said computer is, or is part of, a system that provides a service, and wherein said first indication of performance describes availability of said service.

7. One or more computer-readable storage media comprising executable instructions to perform a method, the method comprising:
   receiving, from a controller that operates at a first machine, a request to induce a behavior at a second machine on which said instructions execute;
   recording a first value of a performance counter prior to said behavior;
   inducing said behavior in response to said request;
   recording a second value of said performance counter prior to said behavior and a third value of said performance counter after said behavior has ended;
   communicating, to said controller, data that comprises said first value, said second value, and said third value.

8. The one or more computer-readable storage media of claim 7, wherein said behavior comprises non-operation of a program, and wherein said inducing comprises:
   stopping said program.

9. The one or more computer-readable storage media of claim 7, wherein said behavior comprises using a processor up to a percentage of its capacity, and wherein said inducing comprises:
   causing code to execute on said processor until utilization of said processor exceeds said percentage.

10. The one or more computer-readable storage media of claim 7, wherein said behavior comprises unavailability of a data storage component, and wherein said inducing comprises:
    writing to said data storage component until said data storage component has reached capacity.

11. The one or more computer-readable storage media of claim 7, wherein said behavior interferes with said controller's ability to communicate with said second machine, and wherein the method further comprises:
    ceasing said behavior without a contemporaneous direction from said controller to cease said behavior.

12. The one or more computer-readable storage media of claim 7, wherein the method further comprises:
    waiting for an event to finish prior to said inducing of said behavior.

13. The one or more computer-readable storage media of claim 12, wherein the method further comprises:
    reporting a time at which said behavior commences, said time being after completion of said event.

14. A system comprising:
    a first computer on which a controller is installed;
    a first instance of an agent that induces, on a second computer on which said first instance of said agent is installed, a first behavior in response to a first request from said controller, and that collects data about performance on said second computer;
    a report generator that receives said data and that generates, based on information that comprises said data, a report that describes availability of a service provided by a group of one or more computers that include said second computer; and
    an output device that is comprised by, or connected to, said first computer, said report generator communicating said report through said output device.

15. The system of claim 14, further comprising:
    a library that is accessible by said first instance of said agent and that contains a program that, when executed, causes said second computer to carry out said first behavior, said first instance of said agent inducing said first behavior by retrieving said program from said library and causing said program to execute.

16. The system of claim 14, further comprising:
    a second instance of an agent installed on a third computer, wherein said first request is that said first instance of said agent induce said first behavior at a first time, and wherein said controller issues, to said second instance of said agent, a second request that said second instance of said agent induce a second behavior at a second time that differs from said first time.

17. The system of claim 14, further comprising:
    a second instance of an agent that induces, on a third computer on which said second instance of said agent is installed, a second behavior in response to a second request from said controller, wherein said information on which generation of said report is based further comprises performance at said third computer.

18. The system of claim 14, wherein said controller receives a specification that comprises a formula based a performance counter, said data comprising a value of said performance counter, wherein said report generator applies said formula to said value to generate a result, and includes said result in said report.

19. The system of claim 14, wherein said report describes availability of said service before occurrence of said first behavior, during occurrence of said first behavior, and after occurrence of said first behavior.

20. The system of claim 14, wherein said first behavior comprises:

stopping a program that is executing on said second computer;

causing code to execute on a processor of said second computer until utilization of a processor of said second computer exceeds a particular percentage; and writing data to a storage component of said second computer until said data storage component has reached its capacity;

wherein said first behavior is induced at said second machine at a third time, wherein a second instance of said agent installed on a third computer induces, in response to a second request from said controller, a third behavior in said third computer, wherein said first behavior is induced at a first time, wherein said second behavior is induced at a second time that is different from said first time, and wherein said report comprises an availability metric that is based on a formula that is contained in a specification that defines said first behavior, said second behavior, and said formula.

* * * * *